United States Patent
Lee et al.

(10) Patent No.: US 7,436,578 B2
(45) Date of Patent: Oct. 14, 2008

(54) ELECTROPHORETIC DISPLAY AND MANUFACTURING METHOD THEREOF

(75) Inventors: Woo-Jae Lee, Yongin-si (KR); Seong-Sik Shin, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 171 days.

(21) Appl. No.: 11/552,345

(22) Filed: Oct. 24, 2006

(65) Prior Publication Data

US 2007/0297039 A1    Dec. 27, 2007

(30) Foreign Application Priority Data

Jun. 22, 2006   (KR) ..................... 10-2006-0056435

(51) Int. Cl.
    *G02B 26/00*   (2006.01)
(52) U.S. Cl. ...................... 359/296; 345/107
(58) Field of Classification Search ............... 359/296, 359/900; 345/107, 105, 49; 430/32, 34, 430/38; 204/450, 600; 264/4.1
    See application file for complete search history.

(56) References Cited

U.S. PATENT DOCUMENTS

| | | | |
|---|---|---|---|
| 6,525,865 B2 * | 2/2003 | Katase | 359/296 |
| 7,286,281 B2 * | 10/2007 | Lee et al. | 359/296 |
| 2002/0008898 A1 | 1/2002 | Katase | |
| 2002/0191133 A1 | 12/2002 | Enomoto et al. | |
| 2004/0145561 A1 | 7/2004 | Ikeda | |
| 2004/0263948 A1 | 12/2004 | Lee et al. | |
| 2005/0104843 A1 | 5/2005 | Schlangen | |

FOREIGN PATENT DOCUMENTS

| | | |
|---|---|---|
| EP | 1557714 | 9/2005 |
| JP | 11-161205 | 6/1999 |
| JP | 2000-322007 | 11/2000 |
| JP | 2003-315845 | 11/2003 |
| JP | 2004-163818 | 6/2004 |
| JP | 2005-107466 | 4/2005 |
| JP | 2004-004282 | 1/2006 |
| KR | 10-2004-0006028 | 1/2004 |
| KR | 10-2004-0036719 | 4/2004 |
| KR | 1020050000680 | 1/2005 |
| KR | 10-0482472 | 4/2005 |

* cited by examiner

*Primary Examiner*—Hung X. Dang
*Assistant Examiner*—Tuyen Q Tra
(74) *Attorney, Agent, or Firm*—Cantor Colburn LLP

(57) ABSTRACT

An electrophoretic display includes a thin film transistor formed on an insulation substrate, a pixel electrode electrically connected to the thin film transistor, a partitioning wall partitioning the pixel electrode, an ink formed on the pixel electrode exposed between sections of the partitioning wall and in which an electrophoretic member is dispersed, and a common electrode panel formed on the ink and the partitioning wall and having a common electrode.

30 Claims, 13 Drawing Sheets

ELECTROPHORETIC DISPLAY AND MANUFACTURING METHOD THEREOF

This application claims priority to Korean Patent Application No. 10-2006-0056435, filed on Jun. 22, 2006, and all the benefits accruing therefrom under 35 U.S.C. § 119, the contents of which in its entirety are herein incorporated by reference.

BACKGROUND OF THE INVENTION (a) Field of the Invention

The present invention relates to an electrophoretic display and a manufacturing method thereof.

(b) Description of the Related Art

Recently, flat panel displays such as liquid crystal displays, organic light emitting diode ("OLED") displays, and electrophoretic displays have been widely used in place of the conventional cathode-ray tube ("CRT").

Among flat panel displays, the electrophoretic display displays an image by rotating electrophoretic particles, which are usually charged pigment particles having a positive charge or a negative charge, according to a voltage applied to a pixel electrode and a common electrode. Another way of displaying images is to move electrophoretic particles toward a pixel electrode or a common electrode depending on the inherent charges of the electrophoretic particles. For example, very small titanium dioxide particles are dispersed in a dark-colored dye solution. This mixture is then sealed in a capsule and placed between the pixel electrode and the common electrode. When a voltage is applied across the plates, the particles migrate electrophoretically to the plate with a charge opposite that of the particles. When the particles are drawn to the front of the display by an attracting charge the display appears white due to the highly reflective particles; when the particles are drawn to the back of the display the display will appear dark due to dark-colored dye and absence of particles. A plurality of capsules may be arranged in a pixel arrangement to generate images.

The electrophoretic display can be manufactured by making electrophoretic particles and a microcapsule containing a dispersion medium in which electrophoretic particles are dispersed, and then disposing the microcapsule on a pixel electrode of a thin film transistor array panel.

However, in the manufacturing of the electrophoretic display, it is not easy to make the electrophoretic particles and the microcapsule containing the dispersion medium in which the electrophoretic particles are dispersed which creates a bottleneck in the manufacturing process thereby decreasing manufacturing efficiency. In addition, it is not easy to precisely dispose the microcapsule on the pixel electrode of the thin film transistor array panel, if a microcapsule is misplaced the display performance is deteriorated.

BRIEF SUMMARY OF THE INVENTION

The present invention provides an electrophoretic display having advantages of excellent manufacturing efficiency and display performance, and a manufacturing method thereof.

An exemplary embodiment of the present invention provides an electrophoretic display including; a thin film transistor on an insulation substrate, a pixel electrode electrically connected to the thin film transistor, a partitioning wall partitioning the pixel electrode into exposure and non-exposure regions, an ink formed on the exposed region of the pixel electrode, an electrophoretic member dispersed in the ink, and a common electrode panel formed on the ink and the partitioning wall and having a common electrode.

The exemplary embodiment may further include an organic layer formed between the ink and the common electrode.

In one exemplary embodiment the partitioning wall may be formed to include at least one of an organic insulating material and an inorganic insulating material.

In one exemplary embodiment the partitioning wall may be formed in a lattice shape.

In one exemplary embodiment the ink including the electrophoretic member may be formed by a jetting member.

In one exemplary embodiment the electrophoretic member may include an electrophoretic particle.

In one exemplary embodiment the electrophoretic particle may include a first electrophoretic particle having one color of blue, green, and red, and a second electrophoretic particle having a black color.

In one exemplary embodiment the electrophoretic particle may include a first electrophoretic particle having one color of yellow, magenta, and cyan, and a second electrophoretic particle having a black color.

In one exemplary embodiment the electrophoretic particle may have one color among blue, green, and red, and the ink may have a black color.

In one exemplary embodiment the electrophoretic particle may have one color of yellow, magenta, and cyan, and the ink may have a black color.

In one exemplary embodiment the electrophoretic member may further include a dispersion medium in which the electrophoretic particle is dispersed, and a capsule containing the electrophoretic particle and the dispersion medium therein.

In one exemplary embodiment the electrophoretic particle may include a first electrophoretic particle having one color of blue, green, and red, and a second electrophoretic particle having a black color.

In one exemplary embodiment the electrophoretic particle may include a first electrophoretic particle having one color of yellow, magenta, and cyan, and a second electrophoretic particle having a black color.

In one exemplary embodiment the electrophoretic particle may have one color of blue, green, and red, and the dispersion medium may have a black color.

In one exemplary embodiment the electrophoretic particle may have one color of yellow, magenta, and cyan, and the dispersion medium has a black color.

An exemplary embodiment of an method of manufacturing an electrophoretic display according to the present invention includes; forming a thin film transistor and a pixel electrode electrically connected to the thin film transistor on an insulation substrate, forming a partitioning wall partitioning the pixel electrode into exposure and non-exposure regions, dropping an ink in which an electrophoretic member is dispersed on the exposure portion of the pixel electrode, forming a common electrode panel by forming a common electrode on an insulation substrate, and adhering the common electrode panel onto the ink and the partitioning wall.

In one exemplary embodiment the forming of the common electrode panel may further include forming an organic layer on the common electrode.

In one exemplary embodiment in the forming of the partitioning wall, the partitioning wall may be formed to include at least one of an organic insulating material and an inorganic insulating material.

In one exemplary embodiment in the forming of the partitioning wall, the partitioning wall may be formed in a lattice shape.

In one exemplary embodiment the dripping of the ink may be performed using a jetting member.

In one exemplary embodiment the electrophoretic member may include an electrophoretic particle.

In one exemplary embodiment the electrophoretic particle may include a first electrophoretic particle having one color of blue, green, and red, and a second electrophoretic particle having a black color.

In one exemplary embodiment the electrophoretic particle may include a first electrophoretic particle having one color of yellow, magenta, and cyan, and a second electrophoretic particle having a black color.

In one exemplary embodiment the electrophoretic particle may have one color of blue, green, and red, and the ink may have a black color.

In one exemplary embodiment the electrophoretic particle may have one color of yellow, magenta, and cyan, and the ink may have a black color.

In one exemplary embodiment the electrophoretic member may further include a dispersion medium in which the electrophoretic particle is dispersed, and a capsule containing the electrophoretic particle and the dispersion medium therein.

In one exemplary embodiment the electrophoretic particle may include a first electrophoretic particle having one color of blue, green, and red, and a second electrophoretic particle having a black color.

In one exemplary embodiment the electrophoretic particle may include a first electrophoretic particle having one color of yellow, magenta, and cyan, and a second electrophoretic particle having a black color.

In one exemplary embodiment the electrophoretic particle may have one color of blue, green, and red, and the dispersion medium may have a black color.

In one exemplary embodiment the electrophoretic particle may have one color of yellow, magenta, and cyan, and the dispersion medium has a black color.

BRIEF DESCRIPTION OF THE DRAWINGS

The present invention will become more apparent by describing exemplary embodiments thereof in more detail with reference to the accompanying drawings, in which.

DETAILED DESCRIPTION OF THE INVENTION

Figure 1:
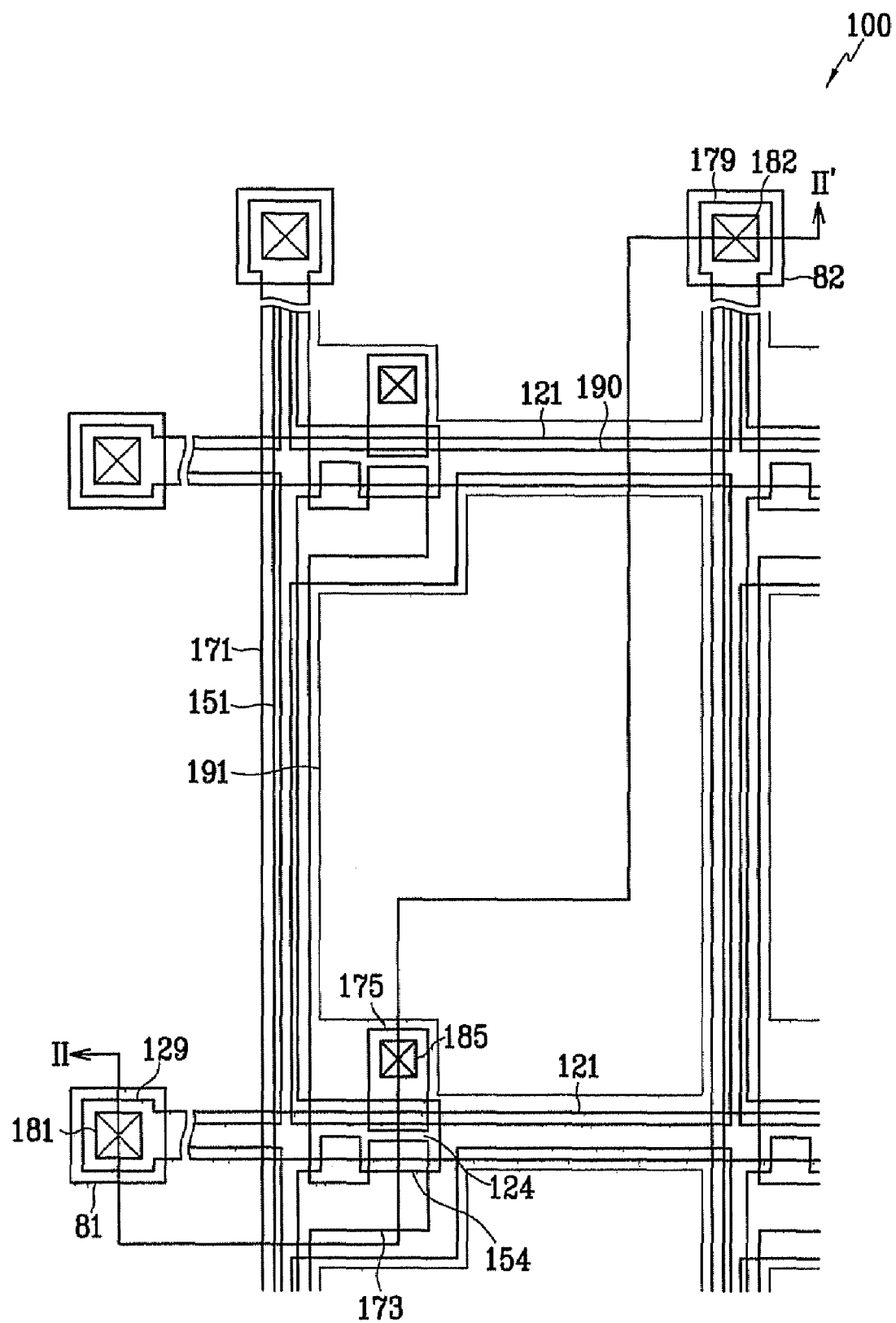
FIG. 1 is a top plan layout view showing an exemplary embodiment of a structure of an electrophoretic display according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

An exemplary embodiment of an electrophoretic display according to the present invention and a manufacturing method thereof will be now explained with reference to the accompanying drawings.

First, an exemplary embodiment of an electrophoretic display according to the present invention will now be explained in more detail with reference to FIG. 1 and FIG. 2.

Figure 2:
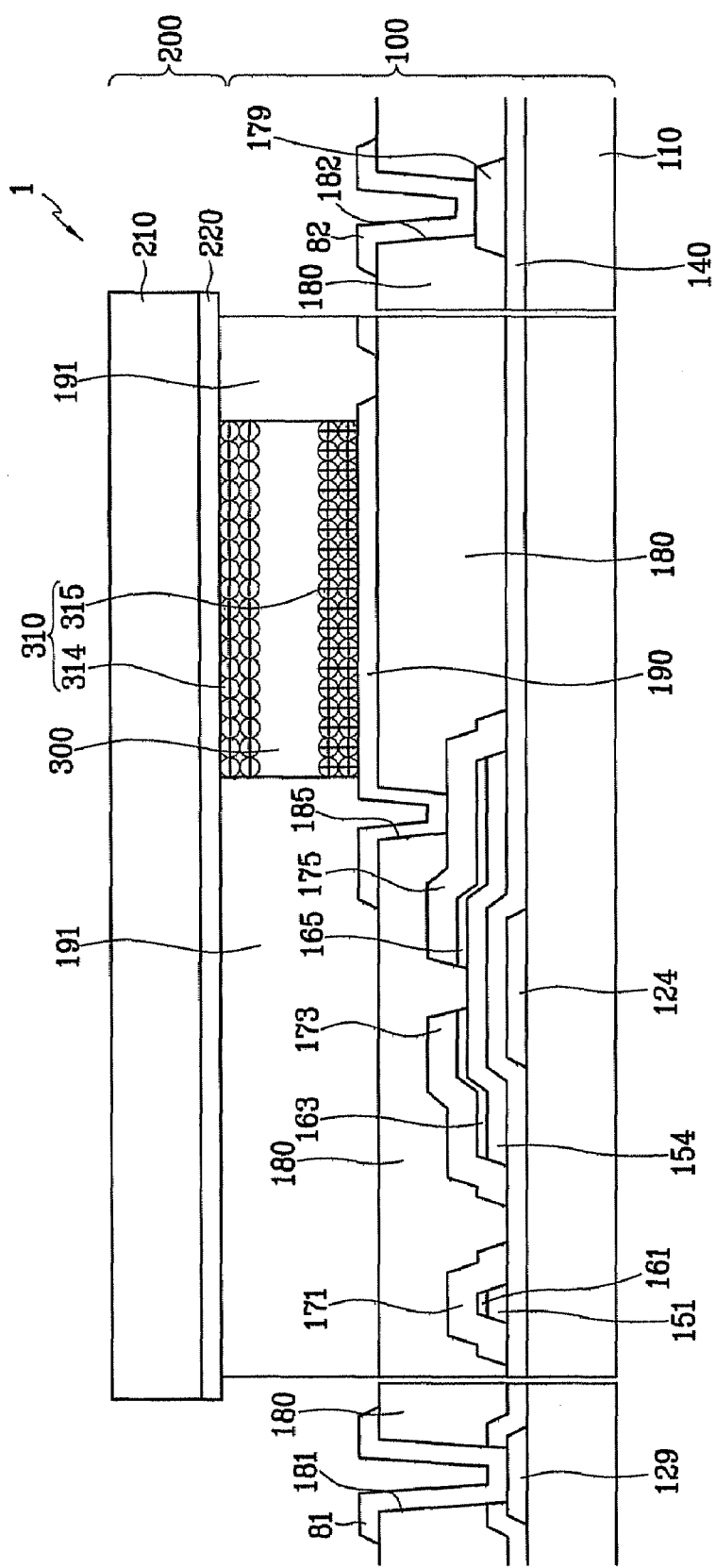
FIG. 2 is a cross-sectional view of the exemplary embodiment of an electrophoretic display of FIG. 1 taken along line II-II'.

FIG. 1 is a top plan layout view showing an exemplary embodiment of a structure of an electrophoretic display according to the present invention, and FIG. 2 is a cross-sectional view of the exemplary embodiment of an electrophoretic display of FIG. 1 taken along line II-II'.

An exemplary embodiment of an electrophoretic display 1 according to the present invention includes a thin film transistor array panel 100 and a common electrode panel 200 which are disposed opposite each other.

The thin film transistor array panel 100 will now be explained in more detail.

As shown in FIG. 1 and FIG. 2, a plurality of gate lines 121 transmitting gate signals are formed on an insulation substrate 110, exemplary embodiments of which are made of transparent glass or similar substances. The gate line 121 extends in a horizontal direction, and each of the gate lines 121 includes a plurality of gate electrodes 124 and an end portion 129 which is enlarged so as to have wide area for a connection to other layers or external driving circuits (not shown).

Alternative exemplary embodiments include configurations wherein the gate lines are connected directly to driving circuits without the need for end portions.

Exemplary embodiments of the gate line 121 may be made of an aluminum group metal such as aluminum (Al) or an aluminum alloy, a silver group metal such as silver (Ag) or a silver alloy, a copper group metal such as copper (Cu) or a copper alloy, a molybdenum group metal such as molybdenum (Mo) or a molybdenum alloy, chromium, titanium, or tantalum. Alternative exemplary embodiments include configurations where the gate line 121 may include two layers having different physical properties, that is, a lower layer (not shown) and an upper layer (not shown) disposed on the lower layer. In such an alternative exemplary embodiment the upper layer is made of a metal having a low resistivity, for example an aluminum group metal such as aluminum (Al) or an aluminum alloy, so as to reduce a signal delay or a voltage drop of the gate line 121; and the lower layer is made of a different material, particularly a material having excellent contact characteristics with indium tin oxide ("ITO") and indium zinc oxide ("IZO"), for example molybdenum (Mo), a molybdenum alloy, chromium (Cr), or other similar substances. One exemplary embodiment of the alternative configuration is where the lower layer and the upper layer are a chromium/ aluminum-neodymium alloy combination. Still other alternative exemplary embodiments include configurations where the structure of the gate line 121 may include more than two layers.

A gate insulating layer 140, which is made of silicon nitride ("SiNx") or the like, is formed on the gate line 121.

On the gate insulating layer 140, a plurality of semiconductor stripe layers 151, exemplary embodiments of which are made of hydrogenated amorphous silicon or other similar substances, are formed. Each semiconductor stripe layer 151 extends in a vertical direction, and includes a plurality of protrusions 154 protruding toward the gate electrode 124. In addition, a width of the semiconductor stripe layer 151 is increased near a region where the semiconductor stripe layer 151 meets a gate line 121 so as to cover a wide area of the gate line 121.

A plurality of ohmic contact stripes and islands 161 and 165, exemplary embodiments of which are made of a material such as silicide or n+ hydrogenated amorphous silicon in which an n-type impurity is doped at a high concentration, are formed on the semiconductor layer 151. The ohmic contact stripe 161 includes a plurality of protrusions 163. A protrusion 163 and an ohmic contact island 165 are disposed on a protrusion 154 of the semiconductor 151 in a pair and are disposed opposite one another with respect to the gate electrode 124.

A plurality of data lines 171 and a plurality of drain electrodes 175 are formed on the ohmic contacts 163 and 165 and the gate insulating layer 140.

The data lines 171 extend in a vertical direction so as to cross the gate lines 121, and transmit a data voltage. Each of the data lines 171 includes a plurality of source electrodes 173 extending toward the gate electrode 124 to be bent in a "J" shape towards the gate electrode 124. The data lines 171 also include an end portion 179 having a wide area for connection to another layer or an external driving circuit. Similar to the gate lines 121, alternative exemplary embodiments include configurations wherein the data lines are connected directly to driving circuits without the need for end portions 179. A pair of a source electrode 173 and a drain electrode 175 are separated from each other, and are disposed at opposite sides of the gate electrode 124.

Exemplary embodiments of the data lines 171 and the drain electrodes 175 may be made of a metal having thermal resistance such as chromium, a molybdenum group metal, tantalum, and titanium. Alternative exemplary embodiments of the data lines 171 and drain electrodes 175 include configurations, similar to those of the gate lines 121, wherein they may have a multilayer structure including a lower layer (not shown) made of molybdenum (Mo), a molybdenum alloy, chromium (Cr), or the like, and an upper layer (not shown) made of an aluminum group metal and disposed on the lower layer.

A gate electrode 124, a source electrode 173, and a drain electrode 175, together with a protrusion 154 of the semiconductor layer 151, form a thin film transistor ("TFT"), and a channel of the TFT is formed at the protrusion 154 between the source electrode 173 and the drain electrode 175.

The ohmic contacts 161 and 165 are disposed between the semiconductor layer 151 and the source electrode 173 and drain electrode 175, and serves to lower the contact resistance therebetween.

The semiconductor stripe layer 151 has portions which are exposed without being covered by the data line 171 and the drain electrode 175, including a region between the source electrode 173 and the drain electrode 175. A width of the semiconductor stripe layer 151 is less than a width of the data line 171 in most regions, but as described above, a width of the semiconductor stripe layer 151 is increased at the region where the semiconductor stripe layer 151 meets the gate line 121, so that insulation between the gate line 121 and the data line 171 is enhanced.

A passivation layer 180 is formed on the data line 171, the source electrode 173, and the drain electrode 175. Exemplary embodiments of the passivation layer 180 are made of an organic material having an excellent planarization characteristic and having photosensitivity, a low dielectric constant insulating material such as a-Si:C:O, a-Si:O:F, or other similar materials. When made of an organic material, the passivation layer 180 may be formed by plasma enhanced chemical vapor deposition ("PECVD"). Exemplary embodiments of the passivation layer 180 may also be made of an inorganic material such as silicon nitride SiNx, formed in a single layer or in multi-layers. For example, in the exemplary embodiment where the passivation layer 180 is formed of an organic material, in order to protect the organic material of the passivation layer 180 from contacting exposed portions of the semiconductor layer 154 between the source electrode 173 and the drain electrode 175, an insulating layer (not shown), exemplary embodiments of which is made of silicon nitride (SiNx) or silicon oxide ($SiO_2$), may be further formed below the organic material layer.

A plurality of contact holes 181, 185, and 182, which expose the end portion 129 of the gate line 121, at least a portion of the drain electrode 175, and the end portion 179 of the data line 171, respectively, are formed in the passivation layer 180.

A plurality of pixel electrodes 190 and a plurality of contact assistants 81 and 82, exemplary embodiments of which are made of ITO or IZO, are formed on the passivation layer 180.

Each pixel electrode 190 is physically and electrically connected to a drain electrode 175 through the contact hole 185 so as to receive the data voltage from the drain electrode 175.

The pixel electrode 190 applied with the data voltage in combination with a common electrode 220 of the common electrode panel 200 applied with the common voltage generate an electric field. The electric field changes a position of an electrophoretic member 310, e.g., electrophoretic particles 314 and 315 dispersed in an ink 300, thereby displaying a desired color.

The contact assistants 81 and 82 are respectively connected to the end portions 129 of the gate lines 121 and the end portions 179 of the data lines 171 through the contact holes 181 and 182. The contact assistants 81 and 82 complement the adhesiveness between the end portions of the gate lines 121 and the data lines 171 and an external device such as a driver integrated circuit ("IC") (not shown), and protect these members.

A partitioning wall 191, which includes at least one of an organic insulating material and an inorganic insulating material and partitions the pixel electrodes 190, is formed on the passivation layer 180. The partitioning wall 191 surrounds a portion near an edge of the pixel electrode 190 so as to define a region which is filled with the ink 300 in which the electrophoretic member 310 is dispersed.

A region on the pixel electrode 190 surrounded by the partitioning wall 191 is then filled with the ink 300 in which the electrophoretic member 310 is dispersed.

The ink 300 includes a dripping solvent to allow the electrophoretic member 310 to be dripped in a region on the pixel electrode 190. In addition, the ink 300 includes a dispersion medium enabling the electrophoretic member 310 to flow from the pixel electrode to the common electrode 220 according to voltages applied to the pixel electrode 190 and the common electrode 220 after the electrophoretic member 310 is dripped in the region on the pixel electrode 190. In the present exemplary embodiment, a transparent solvent is used as the ink 300.

The electrophoretic member 310 dispersed in the ink 300 includes the first electrophoretic particles 314 and the second electrophoretic particles 315.

The first electrophoretic particles 314 are charged particles having a negative electrical charge. Exemplary embodiments of the first electrophoretic particles 314 have one color among red, green, and blue, or one color among yellow, magenta, and cyan. Respective first electrophoretic particles 314 having one color among red, green, and blue, or one color among yellow, magenta, and cyan, are sequentially and repeatedly disposed on the plurality of pixel electrodes 190 so that the plurality of pixels receives at least one color in each of the pixels used for display.

The second electrophoretic particles 315 have a black color, and are charged particles having a positive electrical charge.

In an alternative exemplary embodiment, the first electrophoretic particles 314 and the second electrophoretic particles 315 may respectively have a positive electrical charge and a negative electrical charge.

Next, the common electrode panel 200 which is arranged opposite to the thin film transistor array panel 100 will be explained.

The common electrode panel 200 adheres closely to the partitioning wall 191 such that the ink 300 filling the region on the pixel electrode 190 surrounded by the partitioning wall 191 does not leak to the outside. The common electrode panel 200 includes an insulation substrate 210 and a common electrode 220 formed on the insulation substrate 210 to a uniform thickness.

In one exemplary embodiment the common electrode 220 is a transparent electrode made of ITO or IZO. The common electrode 220 applies a common voltage to the electrophoretic member 310.

A method in which the exemplary embodiment of an electrophoretic display 1 according to the present invention displays images of various colors will now be explained.

The exemplary embodiment in which a negative voltage is applied to the pixel electrode 190 through the drain electrode 175 of the electrophoretic display 1 and a positive voltage is applied to the common electrode 220 will now be explained.

In this exemplary embodiment, the first electrophoretic particles 314, which are irregularly dispersed in the ink 300 and have a negative electrical charge, move toward the common electrode 220 to which a positive voltage is applied, and become arranged thereon. Meanwhile, the second electrophoretic particles 315 having a positive electrical charge move toward the pixel electrode 190, and become arranged thereon. After the arrangements, external light injected into the electrophoretic member 310 after passing through common electrode panel 200 is reflected by the first electrophoretic particles 314, and thereby colors of the electrophoretic particles 314 in the respective pixel areas which have been modified by the electric field are displayed.

The exemplary embodiment in which a positive electrical charge is applied to the pixel electrode 190 through the drain electrode 175 of the electrophoretic display 1 and a negative electrical charge is applied to the common electrode 220 will now be explained.

In this exemplary embodiment, the first electrophoretic particles 314 which are irregularly dispersed in the ink 300 and have a negative electrical charge move toward the pixel electrode 190 to which a positive voltage is applied, and become arranged thereon. Meanwhile, the second electrophoretic particles 315 having a positive electrical charge move toward the common electrode 220 to which a negative voltage is applied.

Accordingly, the external light which is injected into the electrophoretic member 310 after passing through the common electrode panel 200 is reflected by the second electrophoretic particles 314 having a black color, and thereby black color is displayed.

In the exemplary embodiment of an electrophoretic display 1 according to the present invention the region on the pixel electrode 190 can be easily filled with the ink 300 in which the electrophoretic member 310 is dispersed. Accordingly, the electrophoretic member 310 on the pixel electrode 190 can be easily and precisely disposed, and thereby manufacturing efficiency and display performance can be improved. In addition, since it is not necessary to include the additional manufacturing steps necessary to make a capsule for containing electrophoretic particles and the dispersion medium, manufacturing efficiency can be further improved.

A manufacturing method of the electrophoretic display 1 according to an exemplary embodiment of the present invention will now be explained in detail with reference to FIGS. 1-3G.

FIGS. 3A-3G are cross-sectional views sequentially showing an exemplary embodiment of a manufacturing method of an electrophoretic display according to the present invention.

First, a conductive layer, exemplary embodiments of which are made of an aluminum group metal such as aluminum and an aluminum alloy, a silver group metal such as silver and a silver alloy, a copper group metal such as copper and a copper alloy, a molybdenum group metal such as molybdenum and a molybdenum alloy, chromium, titanium, and tantalum, is formed on the insulation substrate 110 by a method such as a sputtering.

Figure 3A:
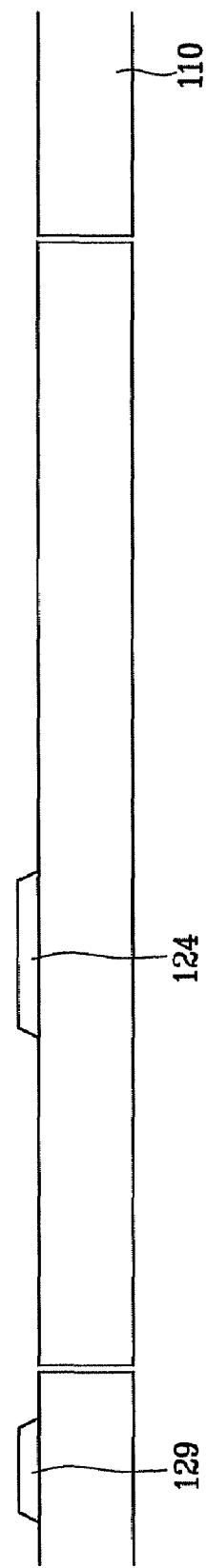
FIGS. 3A to FIG. 3G are cross-sectional views sequentially showing an exemplary embodiment of a manufacturing method of an electrophoretic display according to the present invention.

As shown in FIG. 3A, the conductive layer is then etched by a photolithography process so as to form a plurality of gate lines 121 including a plurality of gate electrodes 124 and the end portions 129 for a connection to an external circuit (not shown).

Figure 3B:
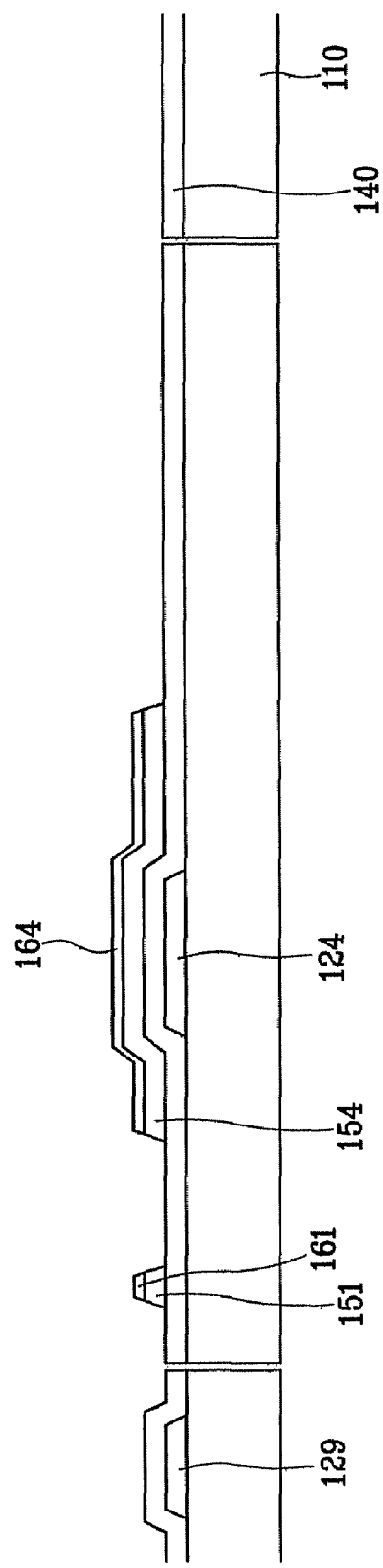

As shown in FIG. 3B, the gate insulating layer 140, the hydrogenated amorphous silicon layer, and the amorphous silicon layer doped with an n-type impurity are then sequentially deposited by a low temperature chemical vapor deposition ("LTCVD") method or a plasma enhanced chemical vapor deposition ("PECVD") method so as to cover the gates line 121. Next the hydrogenated amorphous silicon layer and the amorphous silicon doped with an n-type impurity are patterned, so as to form the semiconductor stripe layer 151 including a plurality of protrusions 154 and a plurality of resistive contact patterns 164 and 161. In one exemplary embodiment the gate insulating layer 140 may be made of silicon nitride or other similar substances.

A conductive layer made of a thermal resistance metal such as chromium, a molybdenum group metal, tantalum, and titanium is then deposited by a method such as sputtering.

Figure 3C:
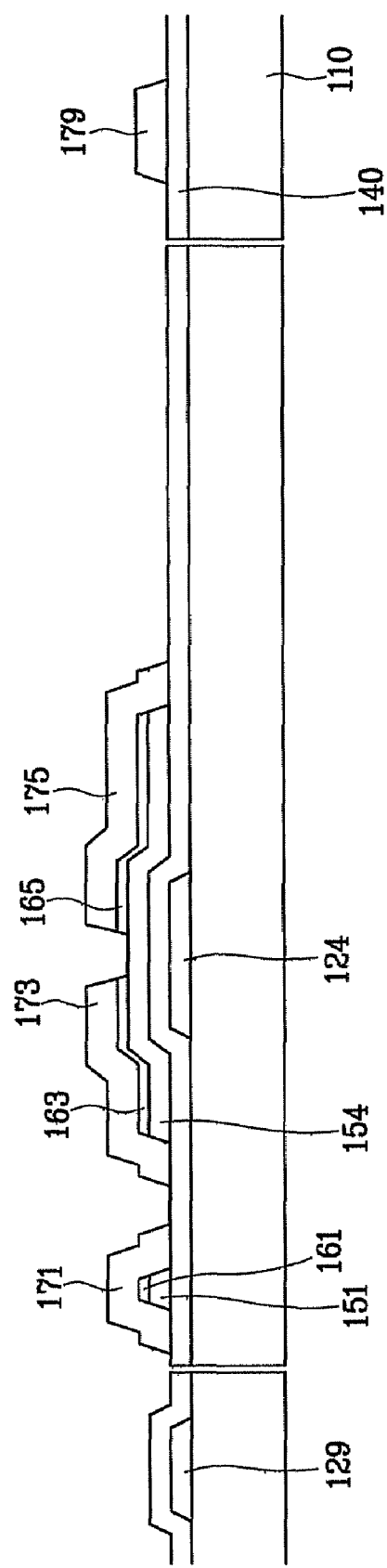

Subsequently, as shown in FIG. 3C, the conductive layer is etched by a photolithography process to form the data lines 171 including a plurality of source electrodes 173 and the end portion 179, and a plurality of drain electrodes 175.

Then, a portion of the resistive contact pattern 164 which is not covered by the data line 171 and the drain electrode 175 is removed so as to divide the resistive contact pattern 164 into the two ohmic contacts 163 and 165 and expose a portion of the semiconductor layer 154 therebetween. In one exemplary embodiment, in order to stabilize the exposed surface of the semiconductor layer 154, an oxygen plasma treatment may be performed.

Figure 3D:
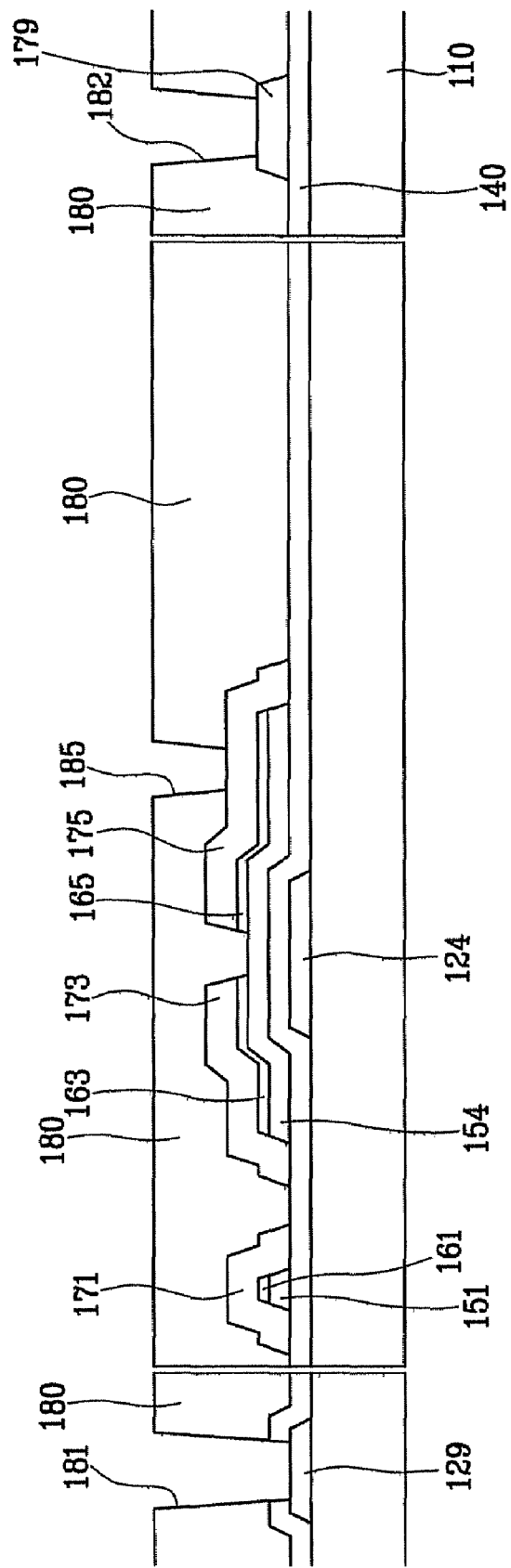

Subsequently, as shown in FIG. 3D, the passivation layer 180 is formed by forming a single layer, or in an alternative exemplary embodiment multi-layers, of an organic material having an excellent planarization characteristic and photosensitivity, a low dielectric constant insulating material such as a-Si:C:O, a-Si:O:F, etc., formed by plasma enhanced chemical vapor deposition ("PECVD"), or an inorganic material such as silicon nitride ("SiNx").

A photoresist is then deposited on the passivation layer 180, and exposure and development of the photoresist are performed using a light mask so as to pattern the photoresist. Then, the passivation layer 180 and the gate insulating layer 140 are patterned by the photolithography process using the photoresist pattern to form a plurality of contact holes 181, 185 and 182.

Figure 3E:
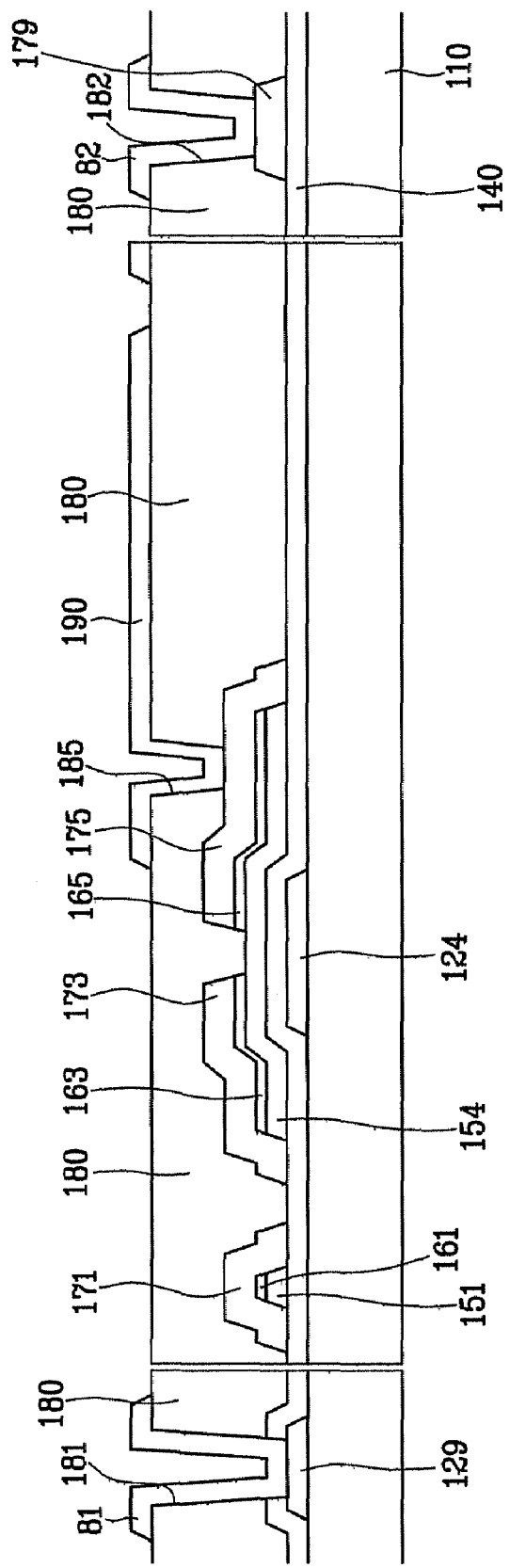

Subsequently, as shown in FIG. 3E, ITO or IZO is deposited on the passivation layer 180 by sputtering, and then a plurality of pixel electrodes 190 and a plurality of contact assistants 81 and 82 are formed by a photolithography process.

Figure 3F:
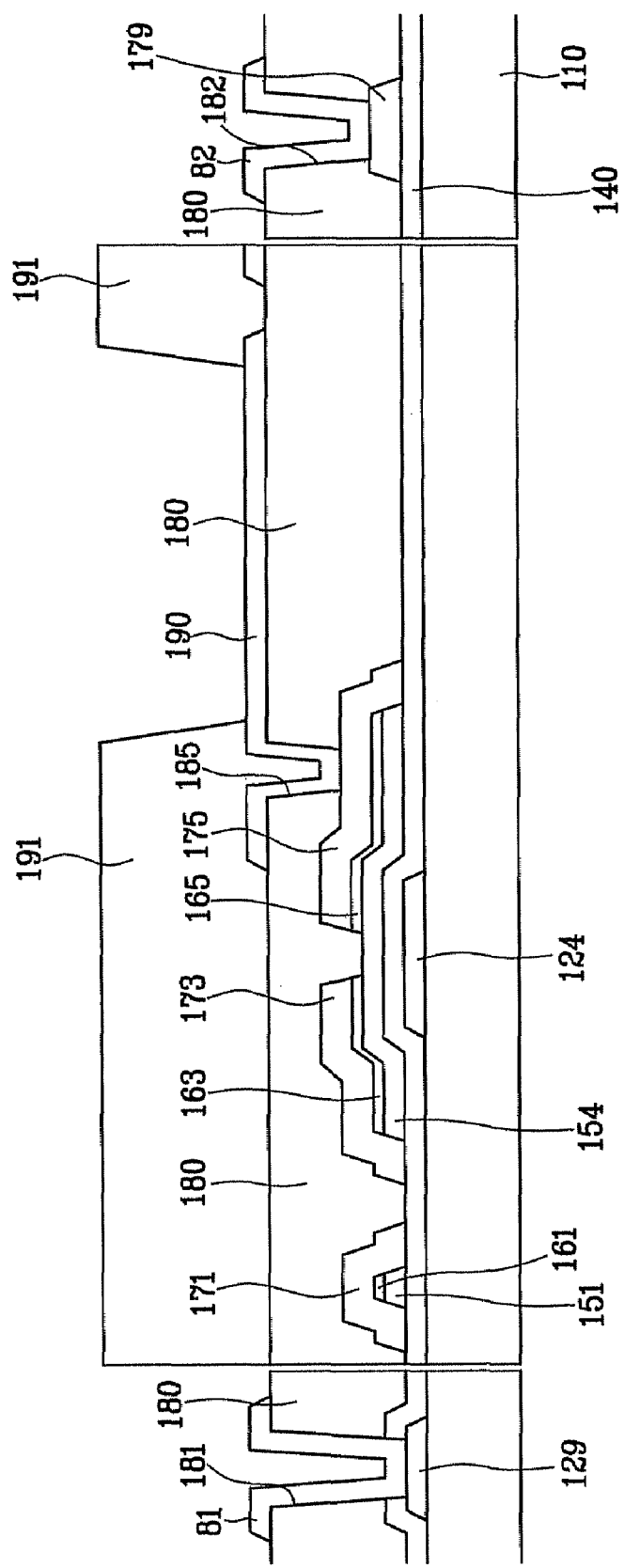

As shown in FIG. 3F, a partitioning wall material, which includes at least one of an organic insulating material and an inorganic insulating material, is then deposited on the passivation layer 180 and the pixel electrode 190. Through patterning with a photolithography process, the partitioning wall material is patterned, and the partitioning wall 191 having a lattice shape exposing regions of the pixel electrode 190 is formed.

Figure 3G:
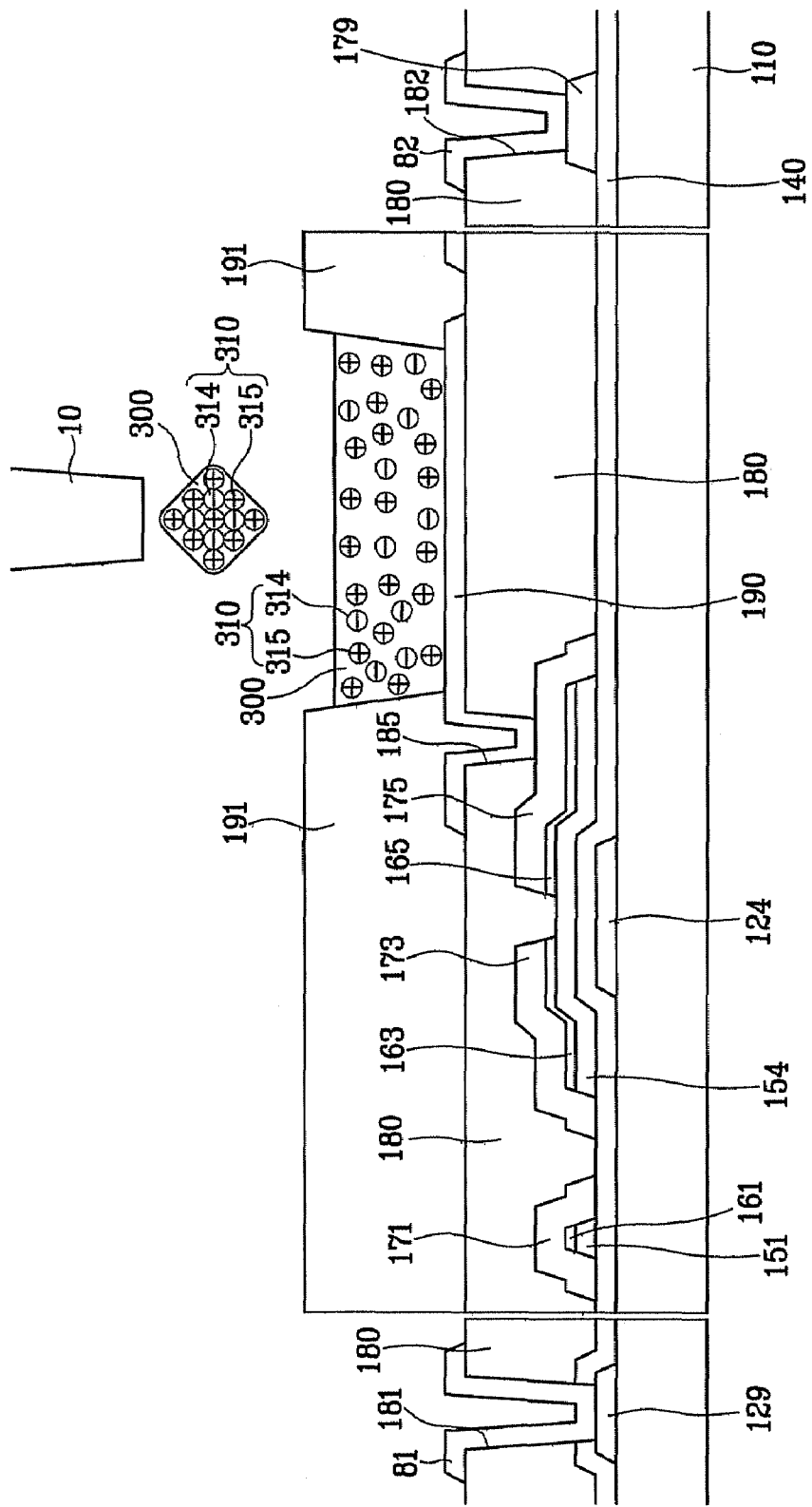

Subsequently, as shown in FIG. 3G, the ink 300 in which the electrophoretic member 310 is dispersed is dripped on the portion of the pixel electrode 190 which was left exposed between the partitioning wall 191. The drip dispersal may be performed using a jetting member 10 so as to fill the region on the pixel electrode 190 defined by the partitioning wall 191 with the ink 300.

The common electrode panel 200 having the common electrode 220 is then adhered to the partitioning wall 191 of the thin film transistor array panel 100, and thereby the electrophoretic display 1 shown in FIGS. 1 and 2 is completed.

In the exemplary embodiment of a manufacturing method of the electrophoretic display 1 according to the present invention, the pixel electrode 190 is partitioned by the partitioning wall 191, so that the electrophoretic member 310 can be easily positioned on the exposed region of the pixel electrode 190 using the jetting member 10. Accordingly, the electrophoretic member 310 can be easily and precisely positioned on the pixel electrode 190, so that manufacturing efficiency and display performance can be substantially improved.

Figure 4:
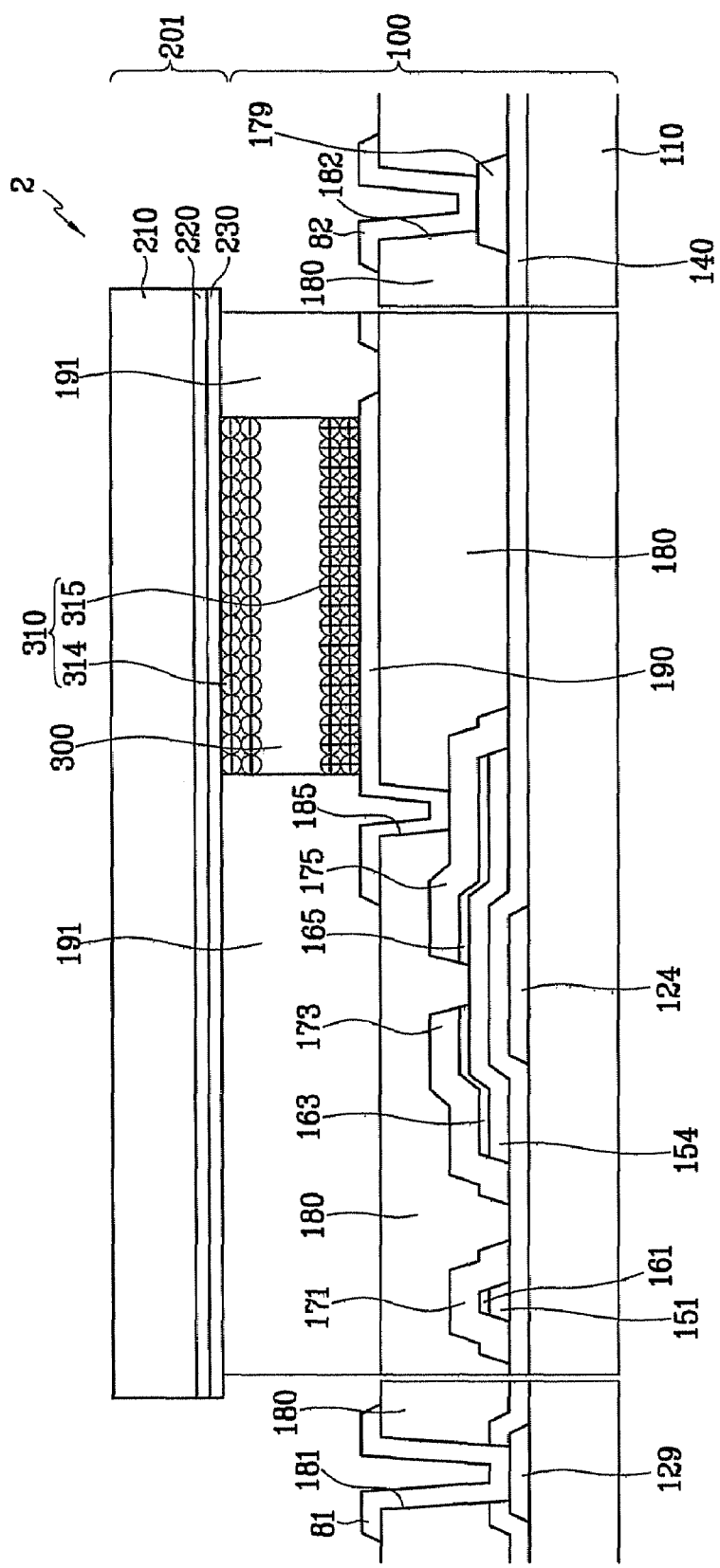
FIG. 4 is a cross-sectional view of another exemplary embodiment of an electrophoretic display according to the present invention.

A second exemplary embodiment of an electrophoretic display 2 according to the present invention will be explained hereinafter with reference to FIG. 4. FIG. 4 is a cross-sectional view of another exemplary embodiment of an electrophoretic display according to the present invention.

Referring to FIG. 4, the electrophoretic display 2 is very similar to the previously described electrophoretic display 1 according to the present invention shown in FIG. 1 and FIG. 2, except that a common electrode panel 201 further includes an organic layer 230 formed on the common electrode 220.

In the exemplary embodiment of an electrophoretic display 2 according to the present invention, since the organic layer 230 is further formed on the common electrode 220, an adhesive force between the common electrode panel 201 and the partitioning wall 191 can be increased.

Figure 5:
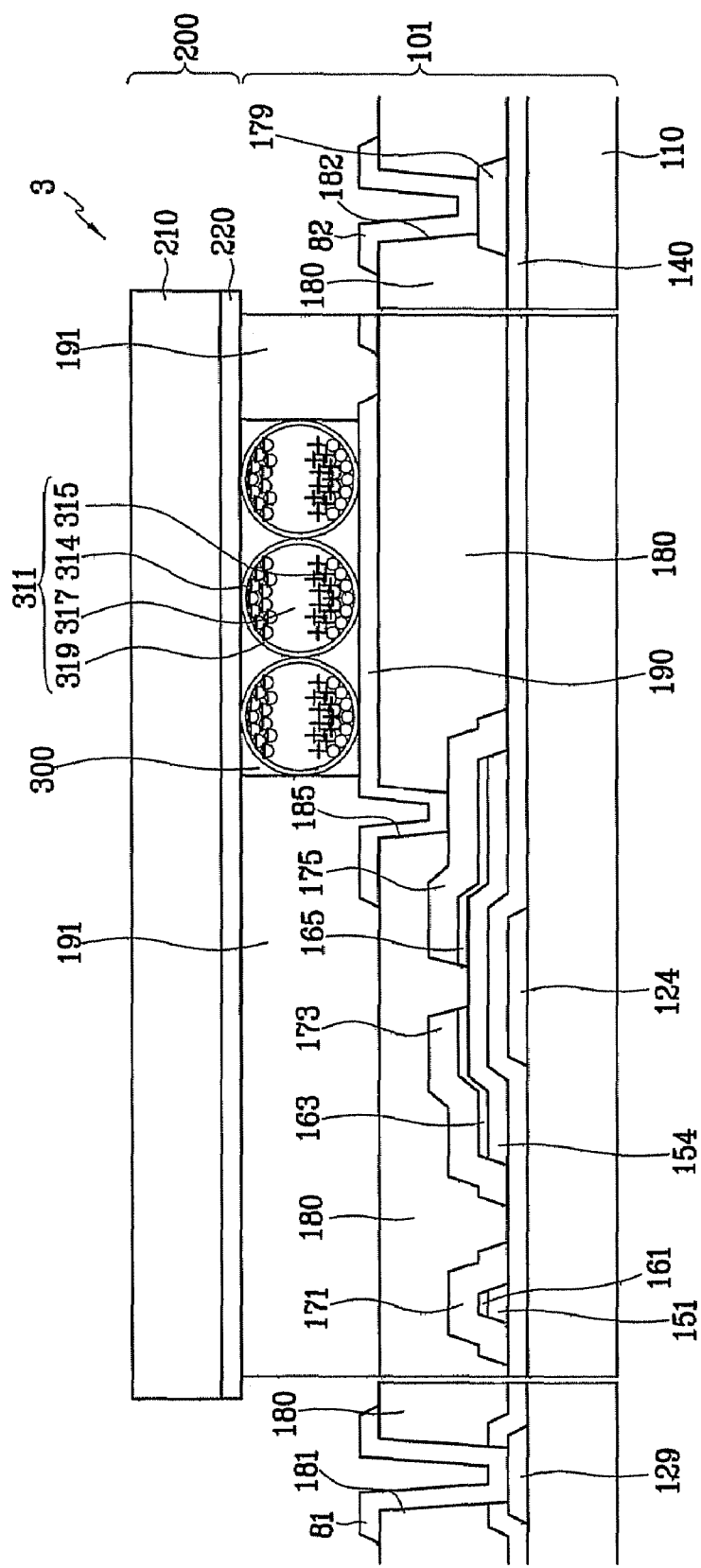
FIG. 5 is a cross-sectional view of another exemplary embodiment of an electrophoretic display according to the present invention.

Another exemplary embodiment of an electrophoretic display 3 according to the present invention will be explained hereinafter with reference to FIG. 5. FIG. 5 is a cross-sectional view of another exemplary embodiment of an electrophoretic display according to the present invention.

Unlike the exemplary embodiment of an electrophoretic display 1 shown in FIG. 1 and FIG. 2, the current exemplary embodiment of an electrophoretic display 3 includes an electrophoretic member 311, which is dispersed in the ink 300 of the thin film transistor array panel 101. The electrophoretic member 311 includes a transparent dispersion medium 317 in which the first electrophoretic particles 314 and the second electrophoretic particles 315 are dispersed, and a capsule 319 containing the first electrophoretic particles 314, the second electrophoretic particles 315, and the transparent dispersion medium 317.

This difference is based on the fact that although the electrophoretic member 311 which is dripped with the ink 300 through the jetting member 10 may be constituted by only the electrophoretic particles 314 and 315, it can also be constituted by the capsule 319 containing the electrophoretic particles 314 and 315 and the transparent medium 317 in which the electrophoretic particles 314 and 315 are dispersed.

Figure 6:
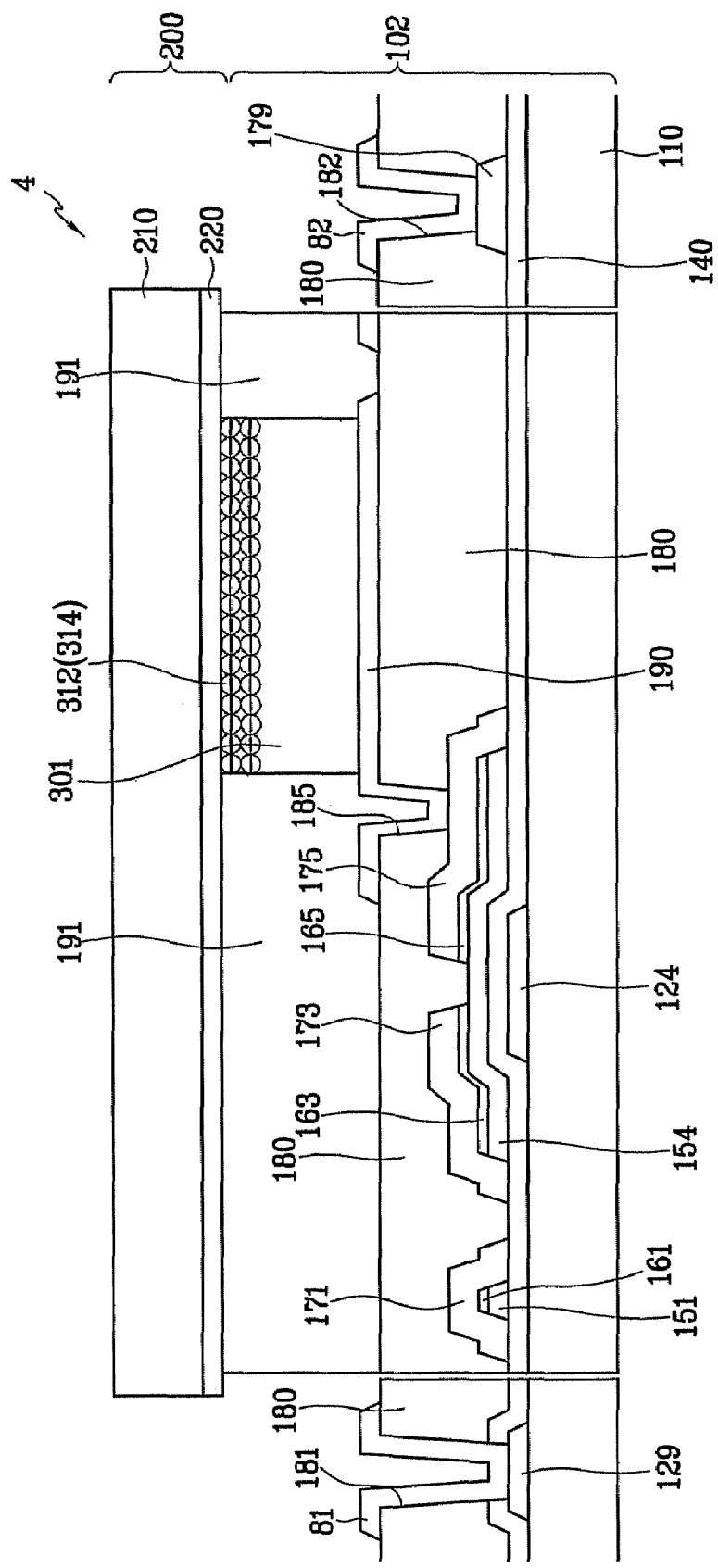
FIG. 6 is a cross-sectional view of another exemplary embodiment of an electrophoretic display according to the present invention.

Another exemplary embodiment of an electrophoretic display 4 according to the present invention will be explained hereinafter with reference to FIG. 6. FIG. 6 is a cross-sectional view of another exemplary embodiment of an electrophoretic display according to the present invention.

Unlike the exemplary embodiment of an electrophoretic display 1 shown in FIG. 1 and FIG. 2, an electrophoretic member 312 of the electrophoretic display 4 according to another exemplary embodiment of the present invention comprises only one kind of electrophoretic particles 314, which are charged particles having a negative or positive (not shown) electrical charge, having one color of red, green, and blue or one color among yellow, magenta, and cyan. In addition, the ink 301 is not transparent but has a black, or opaque, color.

The exemplary embodiment of an electrophoretic display 4 according to the present invention applies a negative voltage to the pixel electrode 190 and a positive voltage to the common electrode 220 so that the electrophoretic particles 314 having the negative electrical charge move toward the common electrode 220 and are then arranged so as to display the color of the electrophoretic particles 314 of the thin film transistor array panel 102. Meanwhile, a positive voltage is applied to the pixel electrode 190 and a negative voltage is applied to the common electrode 220 so that the electrophoretic particles 314 having the negative electrical charge move toward the pixel electrode 190 and are then arranged so as to display a black color. Thereby, external light injected into the ink 300 having a black color is then reflected to the outside so that an image of a black color is displayed.

In another exemplary embodiment of the electrophoretic display 4 the electrophoretic particle 314 may have a positive electrical charge. In this case, voltages applied to the pixel electrode 190 and the common electrode 220 are opposite to the above-described case so as to display colors (both the color of the particle 314 and the black color).

Figure 7:
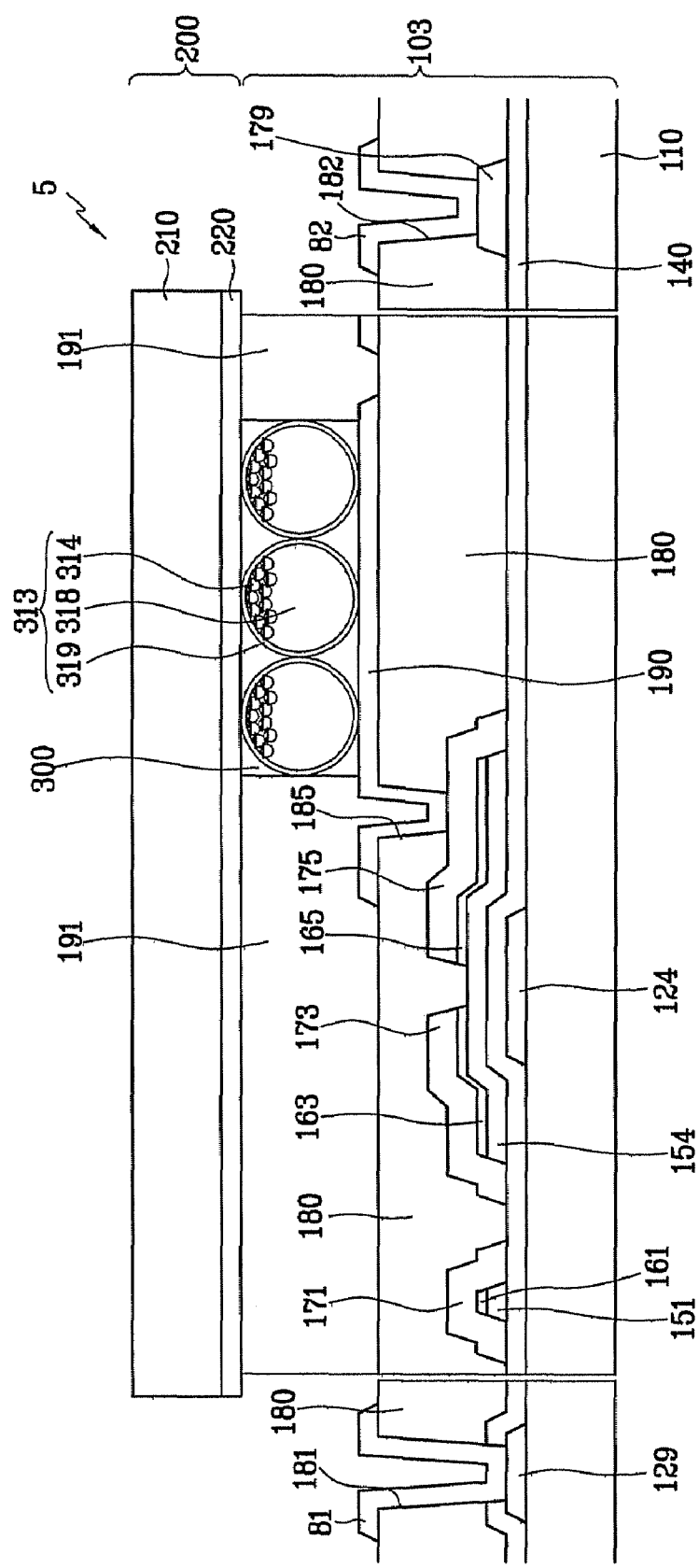
FIG. 7 is a cross-sectional view of another exemplary embodiment of an electrophoretic display according to the present invention.

An exemplary embodiment of an electrophoretic display 5 according to the present invention will be explained hereinafter with reference to FIG. 7. FIG. 7 is a cross-sectional view of another exemplary embodiment of an electrophoretic display according to the present invention.

Unlike the exemplary embodiment of an electrophoretic display 3 shown in FIG. 5, the exemplary embodiment of an electrophoretic display 5 according to the present invention has an electrophoretic member constituted by only one kind of electrophoretic particles 314 dispersed in a dispersion medium 318 of the thin film transistor array panel 103. In addition, the dispersion medium 318 has a black color. Here, the electrophoretic particles 314 of the electrophoretic member 311 are charged particles having a negative or positive (not shown) electrical charge, and have one color among red, green, and blue, or one color among yellow, magenta, and cyan.

The exemplary embodiment of an electrophoretic display 5 according to the present invention applies a negative voltage to the pixel electrode 190 and a positive voltage to the common electrode 220 so that the electrophoretic particles 314 having the negative electrical charge move toward the common electrode 220 and are then arranged, so as to display respective colors of the electrophoretic particles 314. Meanwhile, a positive voltage is applied to the pixel electrode 190 and a negative voltage is applied to the common electrode 220 so that the electrophoretic particles 314 having a negative electrical charge move toward the pixel electrode 190 and are then arranged, so as to display a black color. Thereby, external light is injected into the dispersion medium 318 having a black color and is again reflected to the outside, so that a black color is displayed.

In another exemplary embodiment of the electrophoretic display 5 the electrophoretic particle 314 may have a positive electrical charge. In this case, voltages applied to the pixel electrode 190 and the common electrode 220 are opposite to the above-described case so as to display colors (both the color of the particle 314 and the black color).

Since a partitioning wall 191 partitioning the pixel electrodes 190 is formed in the electrophoretic displays 2, 3, 4, and 5 according to additional exemplary embodiments of the present invention shown in FIG. 4 through FIG. 7, the electrophoretic members 311, 312, and 313 can be easily positioned in the region on the pixel electrode 190 by a method such inkjet printing. Accordingly, the electrophoretic members 311, 312, and 313 can be easily and precisely disposed on the pixel electrode 190, so that manufacturing efficiency and display performance can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the present invention, an electrophoretic display which is easily and precisely manufactured so as to have excellent manufacturing efficiency and display performance and a manufacturing method thereof are provided.

What is claimed is:

1. An electrophoretic display, comprising:
   a thin film transistor on an insulation substrate;
   a pixel electrode electrically connected to the thin film transistor;
   a partitioning wall partitioning the pixel electrode into exposure and non-exposure regions;
   an ink formed on the exposed region of the pixel electrode;
   an electrophoretic member dispersed in the ink; and
   a common electrode panel formed on the ink and the partitioning wall and having a common electrode.

2. The electrophoretic display of claim 1, further comprising an organic layer formed between the ink and the common electrode.

3. The electrophoretic display of claim 1, wherein the partitioning wall is formed to include at least one of an organic insulating material and an inorganic insulating material.

4. The electrophoretic display of claim 1, wherein the partitioning wall is formed in a lattice shape.

5. The electrophoretic display of claim 1, wherein the ink including the electrophoretic member is formed by a jetting member.

6. The electrophoretic display of claim 1, wherein the electrophoretic member includes an electrophoretic particle.

7. The electrophoretic display of claim 6, wherein the electrophoretic particle comprises:
   a first electrophoretic particle having one color of blue, green, and red; and
   a second electrophoretic particle having a black color.

8. The electrophoretic display of claim 6, wherein the electrophoretic particle comprises:
   a first electrophoretic particle having one color of yellow, magenta, and cyan; and
   a second electrophoretic particle having a black color.

9. The electrophoretic display of claim 6, wherein:
   the electrophoretic particle has one color of blue, green, and red; and
   the ink has a black color.

10. The electrophoretic display of claim 6, wherein:
    the electrophoretic particle has one color of yellow, magenta, and cyan; and
    the ink has a black color.

11. The electrophoretic display of claim 6, wherein the electrophoretic member further comprises:
    a dispersion medium in which the electrophoretic particle is dispersed; and
    a capsule containing the electrophoretic particle and the dispersion medium therein.

12. The electrophoretic display of claim 11, wherein the electrophoretic particle comprises:
    a first electrophoretic particle having one color of blue, green, and red; and
    a second electrophoretic particle having a black color.

13. The electrophoretic display of claim 11, wherein the electrophoretic particle comprises:
    a first electrophoretic particle having one color of yellow, magenta, and cyan; and
    a second electrophoretic particle having a black color.

14. The electrophoretic display of claim 11, wherein:
    the electrophoretic particle has one color of blue, green, and red; and
    the dispersion medium has a black color.

15. The electrophoretic display of claim 11, wherein:
    the electrophoretic particle has one color of yellow, magenta, and cyan; and
    the dispersion medium has a black color.

16. A method of manufacturing an electrophoretic display, comprising:
    forming a thin film transistor and a pixel electrode electrically connected to the thin film transistor on an insulation substrate;
    forming a partitioning wall partitioning the pixel electrode into exposure and non-exposure regions;
    dropping an ink in which an electrophoretic member is dispersed on the exposure region of the pixel electrode;
    forming a common electrode panel by forming a common electrode on an insulation substrate; and
    adhering the common electrode panel onto the ink and the partitioning wall.

17. The method of manufacturing an electrophoretic display of claim 16, wherein the forming of the common electrode panel further comprises forming an organic layer on the common electrode.

18. The method of manufacturing an electrophoretic display of claim 16, wherein in the forming of the partitioning wall, the partitioning wall is formed to include at least one of an organic insulating material and an inorganic insulating material.

19. The method of manufacturing an electrophoretic display of claim 16, wherein in the forming of the partitioning wall, the partitioning wall is formed in a lattice shape.

20. The method of manufacturing an electrophoretic display of claim 16, wherein the dripping of the ink is performed using a jetting member.

21. The method of manufacturing an electrophoretic display of claim 16, wherein the electrophoretic member includes an electrophoretic particle.

22. The method of manufacturing an electrophoretic display of claim 21, wherein the electrophoretic particle comprises:
    a first electrophoretic particle having one color of blue, green, and red; and
    a second electrophoretic particle having a black color.

23. The method of manufacturing an electrophoretic display of claim 21, wherein the electrophoretic particle comprises:
    a first electrophoretic particle having one color of yellow, magenta, and cyan; and
    a second electrophoretic particle having a black color.

24. The method of manufacturing an electrophoretic display of claim 21, wherein:
    the electrophoretic particle has one color of blue, green, and red; and
    the ink has a black color.

25. The method of manufacturing an electrophoretic display of claim 21, wherein:
    the electrophoretic particle has one color of yellow, magenta, and cyan; and
    the ink has a black color.

26. The method of manufacturing an electrophoretic display of claim 21, wherein the electrophoretic member further comprises:
    a dispersion medium in which the electrophoretic particle is dispersed; and
    a capsule containing the electrophoretic particle and the dispersion medium therein.

27. The method of manufacturing an electrophoretic display of claim 26, wherein the electrophoretic particle comprises:
    a first electrophoretic particle having one color of blue, green, and red; and
    a second electrophoretic particle having a black color.

28. The method of manufacturing an electrophoretic display of claim 26, wherein the electrophoretic particle comprises:

a first electrophoretic particle having one color of yellow, magenta, and cyan; and a second electrophoretic particle having a black color.

29. The method of manufacturing an electrophoretic display of claim 26, wherein:

the electrophoretic particle has one color of blue, green, and red; and the dispersion medium has a black color.

30. The method of manufacturing an electrophoretic display of claim 26, wherein:

the electrophoretic particle has one color of yellow, magenta, and cyan; and the dispersion medium has a black color.

* * * * *